US005999604A

United States Patent [19]

Walter

[11] Patent Number: 5,999,604

[45] Date of Patent: Dec. 7, 1999

[54] SYSTEM AND METHOD FOR MANAGING A TELECOMMUNICATIONS NETWORK BY DETERMINING SERVICE IMPACT

[75] Inventor: Craig Walter, Colorado Springs, Colo.

[73] Assignee: MCI Communications Corporation, Washington, D.C.

[21] Appl. No.: 09/033,705

[22] Filed: Mar. 3, 1998

[51] Int. Cl.[6] .................................................... H04M 15/00

[52] U.S. Cl. .......................... 379/133; 379/134; 379/112; 379/113

[58] Field of Search ............................ 379/111–115, 120, 379/127, 126, 133–134, 137, 139–140, 116–119

[56] References Cited

U.S. PATENT DOCUMENTS

| | | | |
|---|---|---|---|
| 5,606,601 | 2/1997 | Witzman et al. | 379/113 |
| 5,627,886 | 5/1997 | Bowman | 379/111 |
| 5,854,834 | 12/1998 | Gottlieb et al. | 379/113 |

*Primary Examiner*—Huyen Le

*Assistant Examiner*—Duc Nguyen

[57] ABSTRACT

A system and method for managing a telecommunications network through near real time analysis of Call Detail Records (CDRs) is provided. The system and method of the invention reports how a particular call service is performing and how its performance deteriorates as a result of any type of network event, including both hardware and software related events. A feature of the invention is that it provides several levels of service impact reporting, thus providing users with more versatile and detailed network management capabilities.

5 Claims, 16 Drawing Sheets

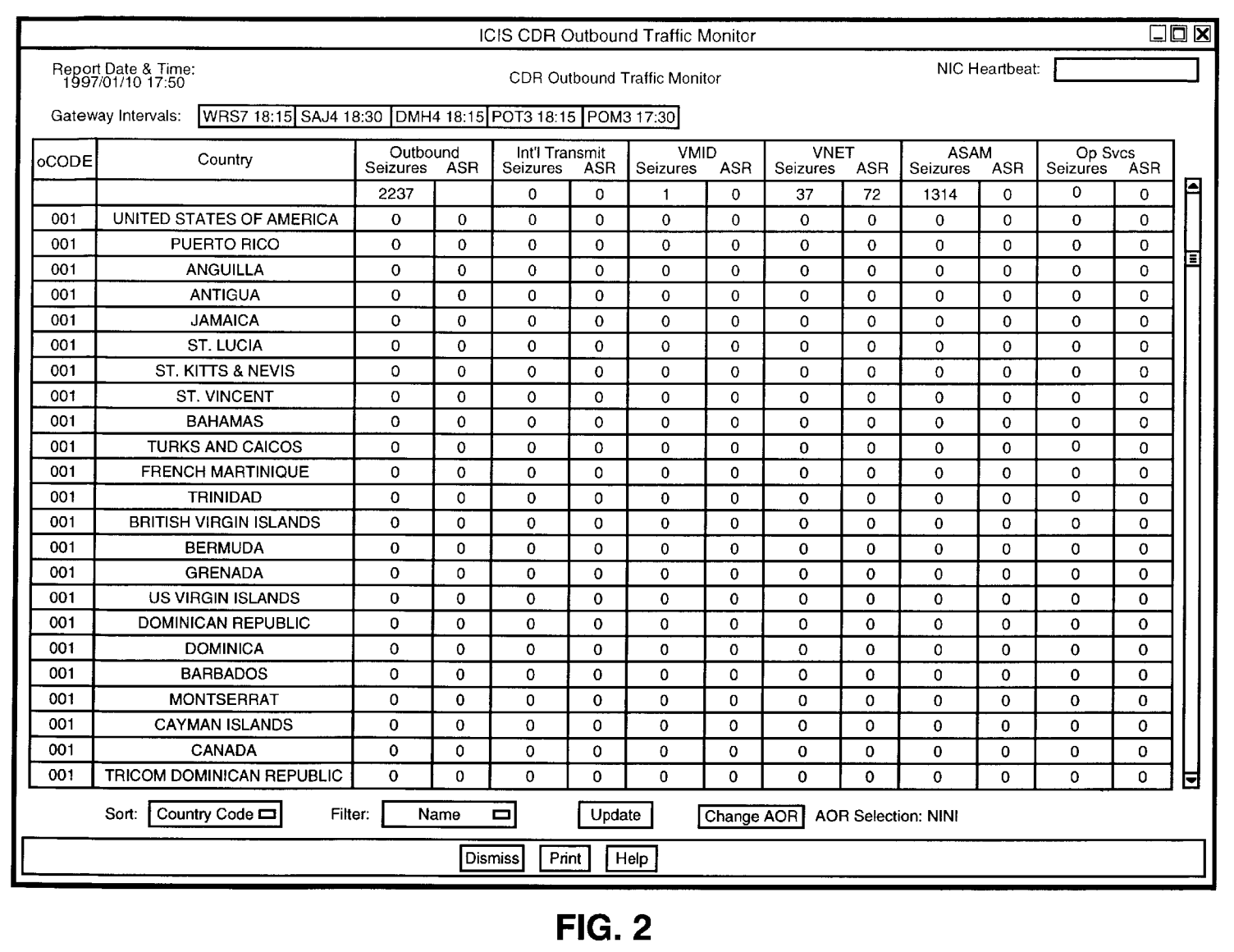

ICIS CDR Outbound Traffic Monitor

Report Date & Time: 1997/01/10 17:50

CDR Outbound Traffic Monitor

NIC Heartbeat:

Gateway Intervals: WRS7 18:15 | SAJ4 18:30 | DMH4 18:15 | POT3 18:15 | POM3 17:30

| oCODE | Country | Outbound | | Int'l Transmit | | VMID | | VNET | | ASAM | | Op Svcs | |
|---|---|---|---|---|---|---|---|---|---|---|---|---|---|
| | | Seizures | ASR | Seizures | ASR | Seizures | ASR | Seizures | ASR | Seizures | ASR | Seizures | ASR |
| | | 2237 | | 0 | 0 | 1 | 0 | 37 | 72 | 1314 | 0 | 0 | 0 |
| 001 | UNITED STATES OF AMERICA | 0 | 0 | 0 | 0 | 0 | 0 | 0 | 0 | 0 | 0 | 0 | 0 |
| 001 | PUERTO RICO | 0 | 0 | 0 | 0 | 0 | 0 | 0 | 0 | 0 | 0 | 0 | 0 |
| 001 | ANGUILLA | 0 | 0 | 0 | 0 | 0 | 0 | 0 | 0 | 0 | 0 | 0 | 0 |
| 001 | ANTIGUA | 0 | 0 | 0 | 0 | 0 | 0 | 0 | 0 | 0 | 0 | 0 | 0 |
| 001 | JAMAICA | 0 | 0 | 0 | 0 | 0 | 0 | 0 | 0 | 0 | 0 | 0 | 0 |
| 001 | ST. LUCIA | 0 | 0 | 0 | 0 | 0 | 0 | 0 | 0 | 0 | 0 | 0 | 0 |
| 001 | ST. KITTS & NEVIS | 0 | 0 | 0 | 0 | 0 | 0 | 0 | 0 | 0 | 0 | 0 | 0 |
| 001 | ST. VINCENT | 0 | 0 | 0 | 0 | 0 | 0 | 0 | 0 | 0 | 0 | 0 | 0 |
| 001 | BAHAMAS | 0 | 0 | 0 | 0 | 0 | 0 | 0 | 0 | 0 | 0 | 0 | 0 |
| 001 | TURKS AND CAICOS | 0 | 0 | 0 | 0 | 0 | 0 | 0 | 0 | 0 | 0 | 0 | 0 |
| 001 | FRENCH MARTINIQUE | 0 | 0 | 0 | 0 | 0 | 0 | 0 | 0 | 0 | 0 | 0 | 0 |
| 001 | TRINIDAD | 0 | 0 | 0 | 0 | 0 | 0 | 0 | 0 | 0 | 0 | 0 | 0 |
| 001 | BRITISH VIRGIN ISLANDS | 0 | 0 | 0 | 0 | 0 | 0 | 0 | 0 | 0 | 0 | 0 | 0 |
| 001 | BERMUDA | 0 | 0 | 0 | 0 | 0 | 0 | 0 | 0 | 0 | 0 | 0 | 0 |
| 001 | GRENADA | 0 | 0 | 0 | 0 | 0 | 0 | 0 | 0 | 0 | 0 | 0 | 0 |
| 001 | US VIRGIN ISLANDS | 0 | 0 | 0 | 0 | 0 | 0 | 0 | 0 | 0 | 0 | 0 | 0 |
| 001 | DOMINICAN REPUBLIC | 0 | 0 | 0 | 0 | 0 | 0 | 0 | 0 | 0 | 0 | 0 | 0 |
| 001 | DOMINICA | 0 | 0 | 0 | 0 | 0 | 0 | 0 | 0 | 0 | 0 | 0 | 0 |
| 001 | BARBADOS | 0 | 0 | 0 | 0 | 0 | 0 | 0 | 0 | 0 | 0 | 0 | 0 |
| 001 | MONTSERRAT | 0 | 0 | 0 | 0 | 0 | 0 | 0 | 0 | 0 | 0 | 0 | 0 |
| 001 | CAYMAN ISLANDS | 0 | 0 | 0 | 0 | 0 | 0 | 0 | 0 | 0 | 0 | 0 | 0 |
| 001 | CANADA | 0 | 0 | 0 | 0 | 0 | 0 | 0 | 0 | 0 | 0 | 0 | 0 |
| 001 | TRICOM DOMINICAN REPUBLIC | 0 | 0 | 0 | 0 | 0 | 0 | 0 | 0 | 0 | 0 | 0 | 0 |

Sort: Country Code   Filter: Name   Update   Change AOR   AOR Selection: NINI

Dismiss   Print   Help

FIG. 2

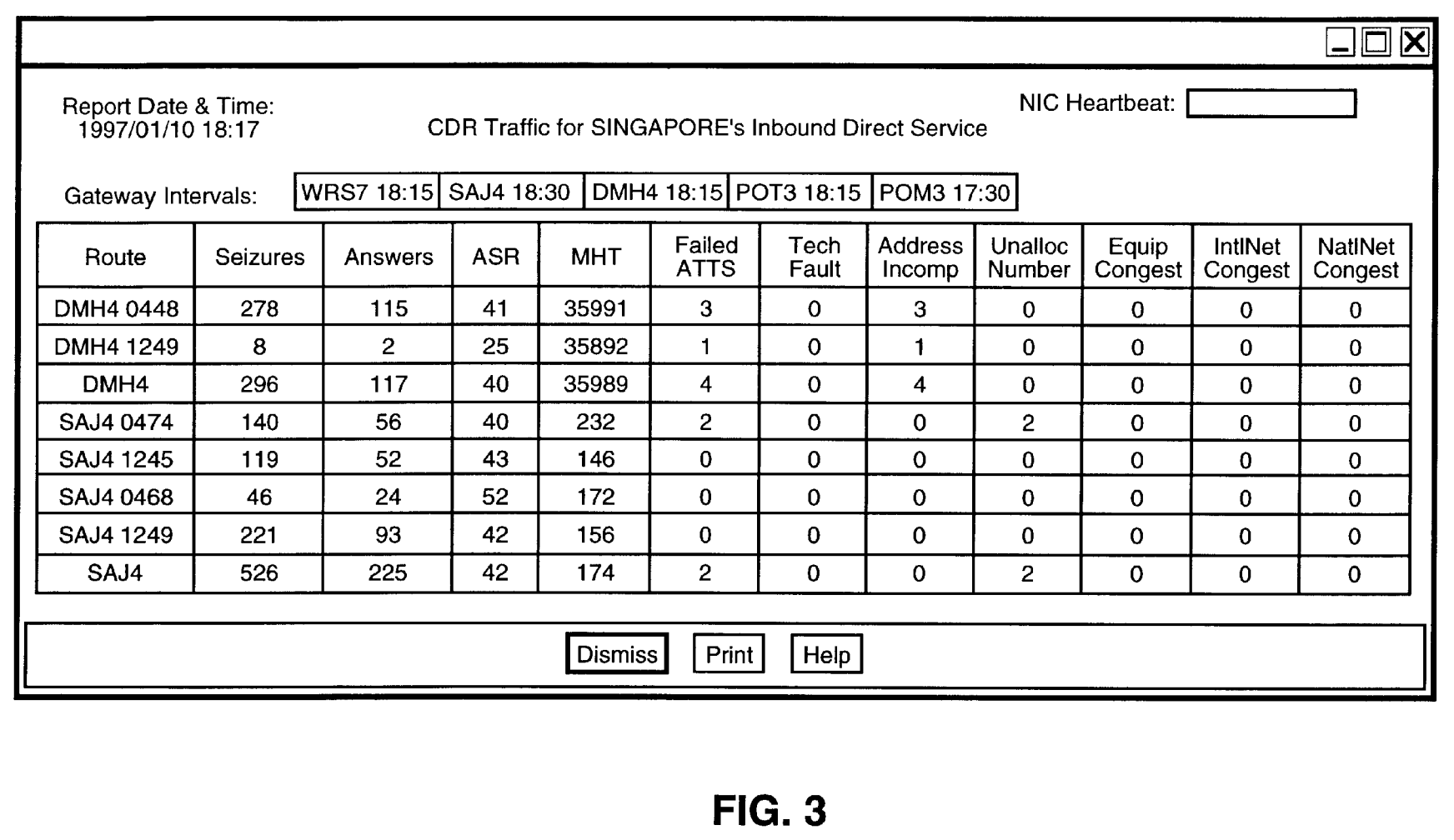

Report Date & Time:
1997/01/10 18:17

CDR Traffic for SINGAPORE's Inbound Direct Service

NIC Heartbeat:

Gateway Intervals: WRS7 18:15 | SAJ4 18:30 | DMH4 18:15 | POT3 18:15 | POM3 17:30

| Route | Seizures | Answers | ASR | MHT | Failed ATTS | Tech Fault | Address Incomp | Unalloc Number | Equip Congest | IntlNet Congest | NatlNet Congest |
|---|---|---|---|---|---|---|---|---|---|---|---|
| DMH4 0448 | 278 | 115 | 41 | 35991 | 3 | 0 | 3 | 0 | 0 | 0 | 0 |
| DMH4 1249 | 8 | 2 | 25 | 35892 | 1 | 0 | 1 | 0 | 0 | 0 | 0 |
| DMH4 | 296 | 117 | 40 | 35989 | 4 | 0 | 4 | 0 | 0 | 0 | 0 |
| SAJ4 0474 | 140 | 56 | 40 | 232 | 2 | 0 | 0 | 2 | 0 | 0 | 0 |
| SAJ4 1245 | 119 | 52 | 43 | 146 | 0 | 0 | 0 | 0 | 0 | 0 | 0 |
| SAJ4 0468 | 46 | 24 | 52 | 172 | 0 | 0 | 0 | 0 | 0 | 0 | 0 |
| SAJ4 1249 | 221 | 93 | 42 | 156 | 0 | 0 | 0 | 0 | 0 | 0 | 0 |
| SAJ4 | 526 | 225 | 42 | 174 | 2 | 0 | 0 | 2 | 0 | 0 | 0 |

Dismiss | Print | Help

FIG. 3

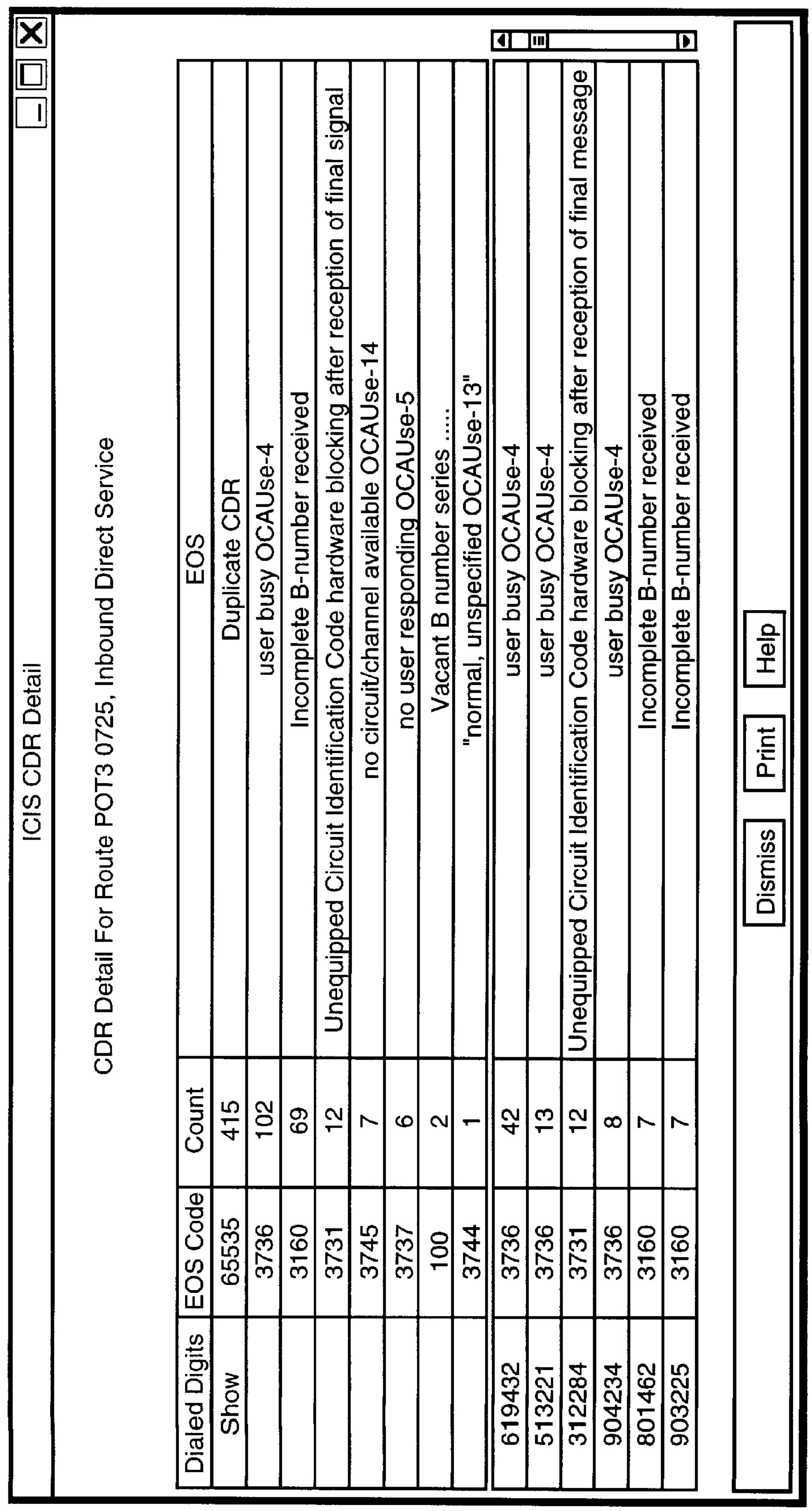

| Dialed Digits | EOS Code | Count | EOS |
|---|---|---|---|
| Show | 65535 | 415 | Duplicate CDR |
| | 3736 | 102 | user busy OCAUse-4 |
| | 3160 | 69 | Incomplete B-number received |
| | 3731 | 12 | Unequipped Circuit Identification Code hardware blocking after reception of final signal |
| | 3745 | 7 | no circuit/channel available OCAUse-14 |
| | 3737 | 6 | no user responding OCAUse-5 |
| | 100 | 2 | Vacant B number series ..... |
| | 3744 | 1 | "normal, unspecified OCAUse-13" |
| 619432 | 3736 | 42 | user busy OCAUse-4 |
| 513221 | 3736 | 13 | user busy OCAUse-4 |
| 312284 | 3731 | 12 | Unequipped Circuit Identification Code hardware blocking after reception of final message |
| 904234 | 3736 | 8 | user busy OCAUse-4 |
| 801462 | 3160 | 7 | Incomplete B-number received |
| 903225 | 3160 | 7 | Incomplete B-number received |

FIG. 9

| EOS | Cat | Description | | | | | |
|---|---|---|---|---|---|---|---|
| 24 | | Called subscriber is busy. | | | | | |
| 25 | UN | Call to a vacant number after suppression of the interception category by a subscriber whose TCL category admits t | | | | | |
| 27 | | Called subscribers line is out of order or blocked | | | | | |
| 28 | | Called subscribers line is in line blocked | | | | | |
| 30 | TF | Forbidden traffic direction. | | | | | |
| 33 | | Subscriber busy. | | | | | |
| 34 | NNC | No idle PBX lines. | | | | | |
| 35 | UN | Unobtainable number. | | | | | |
| 36 | NNC | All PBX lines are in line lockout. | | | | | |
| 37 | NNC | No PBX subroutes in given direction. | | | | | |
| 38 | NNC | Subscribers line out of service. | | | | | |
| 43 | | Send special info tone. | | | | | |
| 53 | EC | Congestion in GSN or similar congestion state | | | | | |
| 54 | EC | Shortage of code sender devices. | | | | | |
| 56 | NNC | Congestion in national network. | | | | | |
| 57 | INC | Congestion in int'l network. | | | | | |
| 60 | UN | Unpermitted traffic case. | | | | | |
| 70 | EC | Congestion in GS after 3 reselections | | | | | |
| 72 | | Hotline. | | | | | |
| 73 | | Hotline after time out. | | | | | |
| 76 | | Time releasing in incoming individual | | | | | |
| 77 | EC | Time release in RE. | | | | | |
| 79 | EC | Congestion in SS after possible reselection of subscriber line | | | | | |
| 85 | UN | Unpermitted B-digit received at traffic to own subscriber | | | | | |
| 89 | TF | Technical fault. EM blocking. | | | | | |
| 90 | INC | Congestion in all alternatives in the routing case | | | | | |
| 91 | UN | Analysis branch within a routing case not specified | | | | | |
| 92 | TF | Incorrect line signal on outgoing side | | | | | |
| 94 | | Insufficient priority in correction with route analysis | | | | | |
| 95 | TF | Technical fault, EM blocking. | | | | | |
| 98 | | Vacant A-number series. | | | | | |
| 99 | UN | Analysis error received if data is not specified for a traffic case switch, value, origin, TCL category or service not v | | | | | |
| 100 | UN | Vacant B number series. | | | | | |
| 101 | | Code reserved for free use. | | | | | |
| 102 | | Code reserved for free use. | | | | | |
| 103 | | Code reserved for free use. | | | | | |
| 104 | | Code reserved for free use. | | | | | |
| 105 | | Code reserved for free use. | | | | | |
| 106 | | Code reserved for free use. | | | | | |
| 107 | | Code reserved for free use. | | | | | |
| 108 | | Code reserved for free use. | | | | | |
| 109 | | Code reserved for free use. | | | | | |
| 110 | | Code reserved for free use. | | | | | |
| 111 | | Code reserved for free use. | | | | | |
| 112 | | Code reserved for free use. | | | | | |
| 113 | | Code reserved for free use. | | | | | |
| 114 | | Code reserved for free use. | | | | | |
| 115 | | Code reserved for free use. | | | | | |

FIG. 10A

| | | | | | | | |
|---|---|---|---|---|---|---|---|
| 116 | | Code reserved for free use. | | | | | |
| 117 | | Code reserved for free use. | | | | | |
| 118 | | Code reserved for free use. | | | | | |
| 119 | | messages in route analysis. Used to give, I.e. alternative messages or actions in connection w/congestion | | | | | |
| 140 | TF | Seizure acknowledgement not received. (time release before seizure acknowledgement | | | | | |
| 141 | EC | Time release during digit transmission | | | | | |
| 142 | TF | Blocking from line at seizure or glare | | | | | |
| 144 | TF | Technical fault on outgoing side in home exchange | | | | | |
| 146 | TF | Path selection failed at seizure of CS device | | | | | |
| 150 | TF | Defective register signal received on the outgoing side | | | | | |
| 151 | TF | Unpermitted digit received from RE | | | | | |
| 154 | TF | Wrong state. Reselection not possible | | | | | |
| 156 | | Free codes for RA. | | | | | |
| 157 | | Free codes for RA. | | | | | |
| 158 | | Free codes for RA. | | | | | |
| 159 | | Free codes for RA. | | | | | |
| 160 | TF | Technical fault on incoming side. EM blocking or faulty MF signal received. | | | | | |
| 162 | TF | Incorrect signal received in CR. Signal not defined in the signalling diagram. | | | | | |
| 163 | TF | Incorrect line signal received on incoming side. | | | | | |
| 164 | EC | Overflow in IT digit store before register is connected. (Timeout before first digit) | | | | | |
| 165 | TF | Timeout between digits. | | | | | |
| 166 | TF | Technical fault on incoming side or EM blocking. | | | | | |
| 167 | TF | Technical fault on outgoing side or EM blocking. | | | | | |
| 168 | EC | Time release during digit transmission | | | | | |
| 169 | | No call acknowledgement signal has been received from PABX | | | | | |
| 170 | | Code reserved for free use | | | | | |
| 171 | | Code reserved for free use | | | | | |
| 172 | | Code reserved for free use | | | | | |
| 173 | | Code reserved for free use | | | | | |
| 174 | | Code reserved for free use | | | | | |
| 175 | | Code reserved for free use | | | | | |
| 176 | | Code reserved for free use | | | | | |
| 177 | | Code reserved for free use | | | | | |
| 178 | | Code reserved for free use | | | | | |
| 179 | | Code reserved for free use | | | | | |
| 180 | | Code reserved for free use | | | | | |
| 181 | | Code reserved for free use | | | | | |
| 182 | | Code reserved for free use | | | | | |
| 183 | | Code reserved for free use | | | | | |
| 184 | | Code reserved for free use | | | | | |
| 185 | | Code reserved for free use | | | | | |
| 186 | UN | Too many B number digits received. | | | | | |
| 187 | EC | Time out for KP or ST signal. | | | | | |
| 188 | EC | Time release during digit transmission. | | | | | |
| 189 | TF | Technical fault on incoming side. | | | | | |
| 190 | TF | Defective line signal or blocking from line received on outgoing side. | | | | | |
| 220 | | Received if a service is to be applied but which is handled by a superior exchange (service center) | | | | | |
| 221 | | Received if a service is to be applied but which is handled by a superior exchange (service center) | | | | | |
| 222 | | Received if a service is to be applied but which is handled by a superior exchange (service center) | | | | | |

FIG. 10B

| 223 | | Received if a service is to be applied but which is handled by a superior exchange (service center) | | | | | |
|---|---|---|---|---|---|---|---|
| 239 | | Request for special info tone sending from AS | | | | | |
| 321 | | Used by SUC, SUCAD, OCODE | | | | | |
| 370 | | Illegal traffic case according to access barring | | | | | |
| 371 | | Illegal traffic case according to access barring | | | | | |
| 372 | | Illegal traffic case according to access barring | | | | | |
| 373 | | Illegal traffic case according to access barring | | | | | |
| 374 | | Illegal traffic case according to access barring | | | | | |
| 375 | | Illegal traffic case according to access barring | | | | | |
| 376 | | Illegal traffic case according to access barring | | | | | |
| 377 | | Illegal traffic case according to access barring | | | | | |
| 378 | | Illegal traffic case according to access barring | | | | | |
| 379 | | Illegal traffic case according to access barring | | | | | |
| 380 | | Illegal traffic case according to access barring | | | | | |
| 381 | | Illegal traffic case according to access barring | | | | | |
| 382 | | Illegal traffic case according to access barring | | | | | |
| 383 | | Illegal traffic case according to access barring | | | | | |
| 384 | | Illegal traffic case according to access barring | | | | | |
| 385 | | Illegal traffic case according to access barring | | | | | |
| 433 | TF | Failure due to improper exchange data | | | | | |
| 462 | | Access barred. | | | | | |
| 467 | TF | Digital path not provided. | | | | | |
| 468 | INC | Special congestion signal (CCS) received | | | | | |
| 469 | | Reset message received after a backward call setup message | | | | | |
| 500 | | Code reserved for free use in RA or DA at B number, route, time supervision, or EOS analysis | | | | | |
| 520 | | Listed in the routing case for emergency routing | | | | | |
| 521 | | | | | | | |
| 522 | | Listed at the end of a routing case for no additional route choices | | | | | |
| 523 | UN | Listed in B number analysis to prevent from dialing 0 after country code | | | | | |
| 524 | | | | | | | |
| 525 | AI | Listed in B number analysis to address incomplete | | | | | |
| 526 | | | | | | | |
| 527 | | | | | | | |
| 528 | UN | Listed in B number analysis to prevent from dialing 9 after the country code | | | | | |
| 529 | | | | | | | |
| 530 | | | | | | | |
| 531 | | | | | | | |
| 533 | | | | | | | |
| 534 | | | | | | | |
| 570 | | Used to provide busy flash. | | | | | |
| 575 | | | | | | | |
| 576 | | | | | | | |
| 580 | | | | | | | |
| 600 | | | | | | | |
| 601 | | | | | | | |
| 625 | AI | Address incomplete. | | | | | |
| 660 | TF | TFC-Alarm received on incoming side | | | | | |
| 661 | TF | TFC-Alarm received on outgoing side | | | | | |
| 675 | | Failed continuity check. | | | | | |

FIG. 10C

| | | |
|---|---|---|
| 676 | | Reset circuit signal received during digit transmission. |
| 679 | INC | Circuit group congestion (CGC) received during digit transmission |
| 680 | EC | Switching equipment congestion signal received. |
| 681 | | Path selection failed at seizure of TC device |
| 777 | | Repeat attempt. |
| 810 | | No or incomplete A number received |
| 811 | | No or incomplete A number received |
| 858 | | Call failure signal received in C7. |
| 859 | TF | Timeout after last address signal. |
| 860 | | Timeout waiting for continuity sig. |
| 865 | TF | Technical fault in code receiver and code sender |
| 878 | | Destination blocking. |
| 879 | | Subscriber not compatible. |
| 902 | | Call is not to be allowed. |
| 903 | | Call is to be allowed. |
| 904 | | No available BWLI individual. |
| 905 | | Function block is not active. |
| 906 | AI | Number collected from RE is incomplete. |
| 907 | | Number of digits collected from RE is not between 6 and 10 |
| 1000 | | Terminating subscriber number in combination with test of out route |
| 1114 | | Requested service not supported at Service Indicator Analysis |
| 1115 | | B subscriber not compatible at terminating compatibility check |
| 1193 | 1193 | Outgoing internal translation failure die to improper exchange data |
| 1608 | | B number info not defined in pre-analysis data |
| 1609 | | A number info not defined in pre-analysis data |
| 1610 | | Supplementary service info for the service User to User 'essential' is barred from sending due to routes |
| 1611 | | Supplementary service info for the service closed to User 'w/o out access' is barred from sending due to incompatibl |
| 1612 | | Supplementary service info for the service User to User 'essential' is barred from sending in a service screening cas |
| 1614 | | Congestion in the CHS Kernel. |
| 1622 | | Tariff message not convertible. |
| 1655 | | Call collision (glare). |
| 1656 | | Reception of unexpected message before first backward message on outgoing side |
| 1657 | | Local HW blocking has occurred either on the incoming side or outgoing side after reception of the first backward r |
| 1658 | | Local HW blocking has occurred either on the incoming side or outgoing side after reception of the first backward r |
| 1659 | | Line HW blocking has occurred either on the incoming side or outgoing side after reception of the first backward m |
| 1660 | | Line reset has occured on the outgoing side before reception of the first backwards message |
| 1661 | | Line maintanence blocking has occurred on the outgoing side before the reception of the first backwards message |
| 1662 | | Unsuccessful continuity check at call setup |
| 1663 | LIN | REL (1) - Unallocated number received |
| 1664 | INC | REL(3) - No route to destination received |
| 1665 | | REL (4) - Send special tone. |
| 1666 | | Release msg = Misdialed Trunk prefix. |
| 1667 | | REL (16) - Normal clearing. |
| 1668 | | REL (17) - User busy. |
| 1669 | | REL (18) - No user responding. |
| 1670 | | REL (19) - No answer from user. |
| 1671 | | REL (21) - Call rejected. |
| 1672 | UN | REL (22) - Number changed. |
| 1673 | | REL (27) - Destination out of order. |

FIG. 10E

| | | | | | | | |
|---|---|---|---|---|---|---|---|
| 1674 | UN | Invalid Number format- REL(28) | | | | | |
| 1675 | | REL (29) - Facility rejected. | | | | | |
| 1676 | | REL (31) - Normal unspecified. | | | | | |
| 1677 | NNC | REL(34) - No circuits available. | | | | | |
| 1678 | | REL (38) - Network out of order. | | | | | |
| 1679 | | REL (41) - Temporary Failure. | | | | | |
| 1680 | EC | REL (42) - Switching equipment congestion | | | | | |
| 1681 | | REL (44) - Requested channel not available | | | | | |
| 1682 | | REL (47) - Resource unavailable unspecified | | | | | |
| 1683 | | REL (55) - Incoming calls barred withing CUG | | | | | |
| 1684 | | REL (57 ) - Bearer capability not authorized | | | | | |
| 1685 | | REL (58) - Bearer capability not presently available | | | | | |
| 1686 | | REL (63) -Service or option not available unspecified | | | | | |
| 1687 | | REL (65) - Bearer capability not implemented | | | | | |
| 1688 | | Requested facility not implemented. | | | | | |
| 1689 | | Only restricted digital info bearer capability is available | | | | | |
| 1690 | | REL (79) - Service or option not implemented | | | | | |
| 1691 | | REL (87) - User not a member of CUG | | | | | |
| 1692 | | REL (88) - Incompatible destination | | | | | |
| 1693 | | REL (95) - Invalid message unspecified | | | | | |
| 1694 | | Message Type non-existent or not implemented | | | | | |
| 1695 | | info element/parameter non-existent or not implemented | | | | | |
| 1696 | | REL (102)- Recovery on timer expired. | | | | | |
| 1697 | | Parameter non-existent or not implemented, passed on | | | | | |
| 1698 | | REL (111) - Protocol error unspecified | | | | | |
| 1699 | | REL (127) - Interworking unspecific | | | | | |
| 2220 | | Requested service not supported at Telecommunications service analysis | | | | | |
| 2324 | | Signalling network failure (outgoing) | | | | | |
| 2402 | | Outgoing route not compatible at outgoing compatibility check | | | | | |
| 2440 | EC | Congestion in the charging output functions. | | | | | |
| 2489 | | Request to link into traffic chain, refused. | | | | | |
| 2746 | | User busy, no call back protection. | | | | | |
| 2783 | | Supplementary service info for the service VPN is barred from sending in a service screening case | | | | | |
| 2784 | | Supplementary service info for the service CUG 'w/o access' is barred from sending in a service screening case or n | | | | | |
| 2785 | | Supplementary service info is not recognized for the service User to User essential by the succeeding exchange | | | | | |
| 2786 | | Supplementary service info is not recognized for the service CUG w/o access by the succeeding exchange | | | | | |
| 2793 | | Preemption. | | | | | |
| 2794 | | Preemption, circuit reserved for reuse. | | | | | |
| 2795 | | Subscriber absent. | | | | | |
| 2796 | | Access info discarded. | | | | | |
| 2797 | | Precedence call blocked. | | | | | |
| 2798 | | Requested facility not subscribed. | | | | | |
| 2799 | | Outgoing calls barred within CUG. | | | | | |
| 2800 | | Inconsistency in designated outgoing... | | | | | |
| 2801 | | Nonexistent CUG | | | | | |
| 2802 | | Invalid transit network | | | | | |
| 2803 | | Message with unrecognized parameter. | | | | | |
| 3158 | INC | No circuit available in transit network. | | | | | |
| 3159 | | Reselection in the transit network applying | | | | | |

FIG. 10F

| | | | | | | | |
|---|---|---|---|---|---|---|---|
| 3160 | AI | Incomplete B-number received. | | | | | |
| 3162 | | Overdecadic digit in conjunction with vacant number | | | | | |
| 3167 | UNN | More digits than the max number of Bdigit | | | | | |
| 3168 | | Subscriber is not allowed to use the subscriber procedure | | | | | |
| 3169 | UNN | Incorrectly dialed subscriber procedure. | | | | | |
| 3170 | | Carrier Analysis code not allowed. | | | | | |
| 3171 | | Successful activation. | | | | | |
| 3172 | | Interrogation, the presubscriber network operator services is activated | | | | | |
| 3173 | | Interrogation, the presubscriber network operator services is not activated | | | | | |
| 3174 | | Number of digits in CAC is faulty. | | | | | |
| 3175 | | Successful deactivation. | | | | | |
| 3176 | | Unsuccessful activation, dumping | | | | | |
| 3177 | | Unsuccessful de-activation, dumping | | | | | |
| 3178 | | CAC not defined in Equal Access analysis | | | | | |
| 3179 | | CAC contains too many digits (overdecadic) | | | | | |
| 3183 | | Allocated numbers. | | | | | |
| 3190 | | User busy and diagnostic with CCBS is possible | | | | | |
| 3407 | | No circuit available and diagnostic with CCBS possible. | | | | | |
| 3408 | | No circuits available and diagnostics with CCBS possible | | | | | |
| 3409 | | User busy and diagnostic with CCBS not possible | | | | | |
| 3410 | | No circuits available and diagnostics with CCBS not possible | | | | | |
| 3435 | | No data specified in the modification analysis | | | | | |
| 3661 | EC | Congestion in the audio controller. | | | | | |
| 3670 | | OINF is not received from the incoming side | | | | | |
| 3671 | | TINF is not received from the incoming side | | | | | |
| 3672 | | Call type derivation not successful | | | | | |
| 3673 | | Received dialling info not defined, dialled info between 0 and 99 | | | | | |
| 3674 | | Received dialling info not defined, dialled info between 100 and 127 | | | | | |
| 3675 | | Originating carrier analysis failed, because no originating carrier pointer is defined for incoming route | | | | | |
| 3676 | | OCA failed, beOCAUse received multi carrier id is not defined for the carrier | | | | | |
| 3732 | UN | Unallocated number OCAUse=5 | | | | | |
| 3733 | | no route to destination OCAUse = 61 | | | | | |
| 3734 | | send special info tone OCAUse = 59 | | | | | |
| 3735 | | normal clearing OCAUse=3 | | | | | |
| 3736 | | user busy OCAUse=4 | | | | | |
| 3737 | | no user responding OCAUse=5 | | | | | |
| 3738 | | no answer from user OCAUse=61 | | | | | |
| 3739 | | Call rejected OCAUse=6 | | | | | |
| 3740 | | number changed OCAUse=7 | | | | | |
| 3741 | | destination out-of-order OCAUse=8 | | | | | |
| 3742 | UN | invalid number format (address incompete) OCAUse=9 | | | | | |
| 3743 | | facility rejected (OCAUse=11) | | | | | |
| 3744 | | normal, unspecified OCAUse=13 | | | | | |
| 3745 | | no circuit/channel available OCAUse=14 | | | | | |
| 3746 | | network out of order OCAUse=15 | | | | | |
| 3747 | | temporary failure OCAUse=16 | | | | | |
| 3748 | EC | switching equipment congestion OCAUse=17 | | | | | |
| 3749 | | requested channel not available OCAUse=19 | | | | | |
| 3750 | | resource unavailable, unspecified OCAUse=20 | | | | | |

FIG. 10G

| | | | | | | |
|---|---|---|---|---|---|---|
| 3751 | | incoming calls barred within CUG OCAUse=52 | | | | |
| 3752 | | Bearer capability not authorized OCAUse=21 | | | | |
| 3753 | | Bearer capability not presently available OCAUse=22 | | | | |
| 3754 | | Service or option not available or unspecified OCAUse=23 | | | | |
| 3755 | | Bearer capability not implemented. OCAUse=24 | | | | |
| 3756 | | Requested facility not implemented. OCAUse=53 | | | | |
| 3757 | | Only restricted digital info bearer capability is available OCAUse=26 | | | | |
| 3758 | | Service or option not implemented. OCAUse=27 | | | | |
| 3759 | | User not member of CUG. OCAUse=62 | | | | |
| 3760 | | Incompatible destination. OCAUse=34 | | | | |
| 3761 | | invalid or unspecified message. OCAUse=35 | | | | |
| 3762 | | Message type nonexistent or not implemented OCAUse = 37 | | | | |
| 3763 | | Parameter nonexisting or not implemented, discarded. OCAUse = 40 | | | | |
| 3764 | | Recovery on timer expiry. OCAUse=44 | | | | |
| 3765 | | Parameter nonexistent or not implemented, passed on. OCAUse = 43 | | | | |
| 3766 | | Protocol error, unspecified. OCAUse=45 | | | | |
| 3767 | | Interworking, unspecified. OCAUse=46 | | | | |
| 3768 | | Preemption OCAUse = 83 | | | | |
| 3769 | | Preemption circuit reserved for reuse. OCAUse=84 | | | | |
| 3770 | | Subscriber absent OCAUse=85 | | | | |
| 3771 | | Access information discarded. OCAUse = 18 | | | | |
| 3772 | | Precedence call blocked. OCAUse = 86 | | | | |
| 3773 | | Requested facility not subscribed. OCAUse=48 | | | | |
| 3774 | | Outgoing calls barred within CUG. OCAUse = 50 | | | | |
| 3775 | | Inconsistency in designated outgoing access info and SCL. OCAUse=87 | | | | |
| 3776 | | Nonexistent CUG. OCAUse=54 | | | | |
| 3777 | | Invalid transit network selection. OCAUse=88 | | | | |
| 3778 | | Message with unrecognized parameter, discarded. OCAUse=89 | | | | |
| 3779 | | No circuit available in transit network. OCAUse=103 | | | | |
| 3780 | | Reselection in the transit network applying load sharing. OCAUse=104 | | | | |
| 3781 | | Misdialed trunk prefix. OCAUse=60 | | | | |
| 3855 | EC | No available echo control device. | | | | |
| 3856 | | ISDN test call procedure failed. Specific route/device can not be selected, does not exist for the current traffic case | | | | |
| 3859 | | Incompatible incoming signaling system. | | | | |

FIG. 10H

SYSTEM AND METHOD FOR MANAGING A TELECOMMUNICATIONS NETWORK BY DETERMINING SERVICE IMPACT

FIELD OF THE INVENTION

This invention relates to telephone networks. More particularly the present invention relates to a network management system and method for analyzing Call Detail Records in near real time to detect, assess and report negative impacts to various call services.

BACKGROUND OF THE INVENTION

Conventional network management systems are comprised of network elements such as switches and transmission equipment. Network elements produce network event records such as report alarms responsive to the occurrence of network events. The term "network events", as used herein, refers to any event that may cause failure of network elements such as faulty transmission equipment, spliced cabling, switch abnormalities and the like. Network management systems are used to monitor communications networks and report alarms and other network events to users or system maintenance personnel.

Recent developments in network management systems enable networks to correlate many different network event records, for the purpose of showing users the correspondence between individual network events and individual network event records. Thus, users can track the effects of a given network event by analyzing the network event records produced responsive to the given network event. This is valuable because a single transmission outage, for example, can result in thousands of network event records being generated.

The present assignee has developed an international network management system, referred to as the International Community Information System (ICIS), that receives numerous network event records from switches and transmission network elements. Typical network event records include trunk alarms that report on the performance of a switch trunk. These network records are not related to any particular call or service. ICIS identifies and correlates switch alarms with transmission alarms, and presents information to the user indicative of the switch event records and transmission network event records that are related to a given network event. This method of network management identifies the network event records that are generated as a result of a given network event.

Typical communications networks support a variety of telephone services. Exemplary services include Inbound, Outbound and Outbound Transit. A limitation of prior art methods of network management is that they do not provide the user with an assessment of how telephone services are impacted by network events, including which services are impacted. This determination must be performed with manual analysis. In fact, many prior art systems are incapable of assessing service impact as a result of network events. This is because when a particular route fails, perhaps due to a fiber cut, calls are automatically switched to another route. This call switching is in accordance with normal network operations, and will go largely undetected as a problem. However, a particular service could be impacted by such an operation.

In addition, calls for a particular service can traverse several different routes. If there is a problem with a particular service, its impact would also traverse several different routes. Since prior art systems rely on the correlation of reported network events, said correlation based on network topology, they would not be able to correlate the different instances of a service problem, since service problems are frequently not tied to network topology.

Another limitation of prior art methods and systems of network management is that they only detect and report problems that result from switching and transmission hardware failures. Often, a minor software fault, such as an error in a call routing translation database, can result in many blocked calls. Since such a problem would not cause the generation of network equipment alarms, it would go undetected by prior art network management systems.

SUMMARY OF THE INVENTION

The present invention is directed to a method and apparatus for analyzing service impacts on telecommunications networks through the analysis of Call Detail Records and call failure ratios. The invention utilizes Call Detail Records as a source of traffic data. Each call generates its own Call Detail Record. These records comprise a wealth of information relating to the calls including information regarding network events (call failures). In accordance with an aspect of the invention, multiple Call Detail Records are grouped or summarized according to various system parameters. For example, all Call Detail Records originating from the same source may be grouped together and Call Detail Records generated within a given time frame may be grouped together to form a multiplicity of subgroups.

Each of the Call Detail Records contained in the multiplicity of subgroups may be further grouped according to the service that carried the corresponding call that generated the Call Detail Record and according to the destination of the corresponding call.

From the forgoing subgroupings of Call Detail Records, the invention generates statistics indicative of a state of call services. Thus, a user is easily able to determine the impact of network events on call services.

In accordance with a first aspect of the invention, a method is provided for analyzing the effects of network events on call services. A plurality of call detail records (CDRs) are received from a plurality of network devices. Each of the CDRs includes a time stamp, call service data and call destination data. The plurality of CDRs are grouped into a plurality of first subgroups according to corresponding network devices and to the time at which they were produced. For each of the plurality of first subgroups, the CDRs are grouped into a plurality of second subgroups according to a call service data and call destination data. Call statistics are then generated indicative of a state of call services from data contained in the CDRs for each of the plurality of second subgroups. Thus, a user is readily able to identify which call services have been affected due to network events.

In accordance with another aspect of the invention, a programmed computer is provided for analyzing the effect of network events on call services. The computer is programmed to carry out a series of steps. The computer receives a plurality of call detail records (CDRs) from a plurality of network devices, each of the plurality of CDRs including a time stamp, call service data and call destination data. The plurality of CDRs are then grouped into a plurality of first subgroups according to corresponding network devices and to the time stamps of the plurality of CDRs. The computer rearranges the CDRs by subgroup. That is, for each of the plurality of first subgroups, the CDRs are grouped into a plurality of second subgroups according to a call service data and call destination data. Call statistics are then generated indicative of a state of call services from data contained in the CDRs for each of the plurality of second subgroups. These statistics may be transmitted to remote terminals for display or they may be displayed by the programmed computer.

BRIEF DESCRIPTION OF THE DRAWINGS

FIG. 2 illustrates a screen print of a system display. The screen print includes information regarding outgoing calls.

FIG. 3 depicts another screen print of a system display. This screen print includes traffic information for Inbound Direct Calls.

FIG. 9 shows another screen print of a system display. The screen print includes route specific call information.

FIG. 10A–10H illustrate a list of call failure reasons.

DETAILED DESCRIPTION OF THE DRAWINGS

General Description

Figure 1:
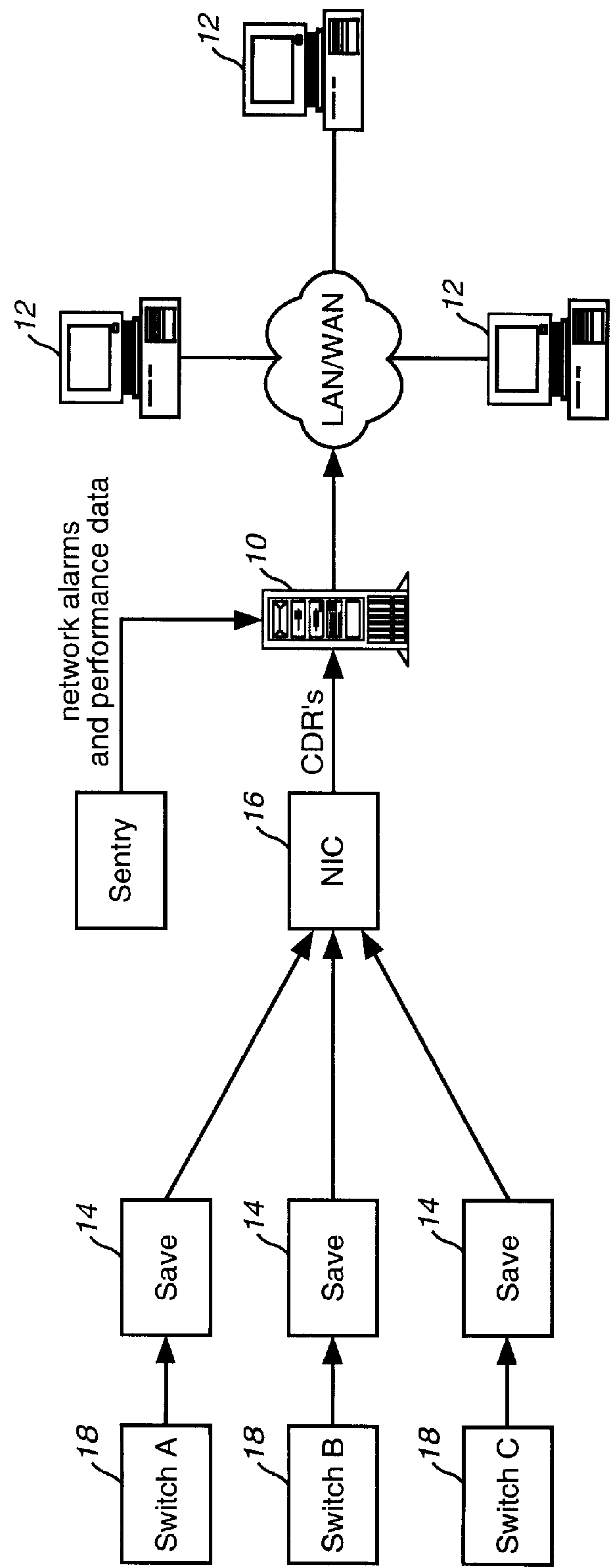
FIG. 1 is an overall view of the system of the present invention.

The invention is directed to a system and method for managing a telecommunications network, which may be comprised of various switches and transmission equipment. FIG. 1 illustrates network architecture in accordance with an embodiment of the invention. The system may be implemented as a software-based system that runs on a general purpose computer. In a preferred embodiment, the system may be realized through a client/server architecture, as shown in FIG. 1. In such a construction, a server 10 may embody software for data processing and analysis, and client computers (hereinafter clients) 12 may provide a Graphical User Interface (GUI) for graphic presentation of call metrics.

Unlike conventional systems, the present invention collects Call Detail Records (CDRs) from the switches 18 and extracts call metrics from the CDRs. Each CDR may include information regarding a particular call. More particularly a CDR may include a series of reserved fields of different lengths in which certain information may be inserted. Such fields may include, for example, END OF SELECTION CODE, TARIFF CLASS, DESTINATION ADDRESS (DIALED DIGITS) ORIGINATING TRUNK GROUP (ROUTE), DESTINATION TRUNK GROUP (ROUTE), GATEWAY ID (SWITCH ID), DISCONNECT TIME and HOLDING TIME as well as other fields. In addition, each CDR includes a timestamp to indicate when it was produced and when the call terminated. Typically, one CDR is created for the incoming port on which the call arrives, and another CDR is created for the outgoing port to which the call is routed. Thus, a single call which traverses one or more switches 18 may generate multiple CDRs. A computer system referred to as a Storage and Verification Element (SAVE) 14 collects, stores, and forwards all CDRs collected from a switch. The CDRs are forwarded to a Network Information Concentrator (NIC) 16, which collects all records generated by call processing elements (switches, service control points, etc.), formats records, and correlates records that are generated for the same call. The NIC 16 then provides processed call records to the server 10 for further processing. These CDRs are preferably provided within seconds of call completion. The clients 12 may then retrieve call metric information from the server 10 for graphical display. A preferred SAVE 14 is described and claimed in U.S. Pat. No. 5,606,601, assigned to the present assignee, and which is herein incorporated by reference. A preferred NIC 16 is described and claimed in U.S. pending patent application Ser. No. 08/426,256, assigned to the present assignee, and which is herein incorporated by reference.

In accordance with an aspect of the present invention, CDRs having like characteristics may be grouped together. More particularly, CDRs may be grouped according to their timestamps and in accordance with the switch from which they were received. Preferably, CDRs generated during a relatively short time interval are grouped together. This time interval is configurable and may be set to any duration, but in particularly preferred embodiments, it is set at about 15 minutes at the request of the user community.

In keeping with the invention, CDRs for a particular switch and time interval are then grouped in accordance with call service and destination metrics. The skilled artisan will readily recognize that there may be various categories of services depending upon the specific implementation of the invention. However, by way of example, in a preferred embodiment there are three categories of service, Outbound service, Inbound service and Outbound Transit service. Outbound service includes calls originating in the U.S. and terminating in a foreign country. Inbound service includes calls originating in a foreign country and terminating in the U.S. Outbound transit service includes calls originating in the U.S., destined for a first foreign country, and transferred to the first foreign country by a transit carrier in a second foreign country. A fourth category of service is Inbound transit service. This service is treated like Inbound service for the purposes of this invention. For each category of service, there are many individual services. A service for a call may be identified by a service code, which is included in the CDR. A service may also be identified by the destination address or "destination trunk group".

The call destination may be a country, a carrier, or both. In accordance with an aspect of the invention, each CDR may be placed in two destination/service groups: one in which the destination is a country and one in which the destination is a carrier. However, in a preferred embodiment, calls for inbound services are grouped by the carrier from which the call is received. The "originating trunk group" field in the CDR is preferably used to associate the call to a carrier. This mapping may be contained in a network topology database (not shown) that is readily accessible to the server 10. Calls for outbound services are preferably grouped by country. The country may be determined by the country code in the dialed digits, which may be included in the CDR. The mapping of country codes to countries may also be contained in the network topology database. Calls for outbound transit services are preferably grouped by the transit carrier. The "destination trunk group" field in the CDR may be used to associate the call to a carrier, the mapping for which may be contained in the network topology database. The final destination of an outbound transit service call may be determined by the country code in the dialed digits, and is therefore presented along with the transit carrier. An exemplary grouping is set forth in Table 1.

TABLE 1

| Service | Route | Terminating Carrier | Dialed Country |
|---|---|---|---|
| Outbound Transit | WRG7 1023 | British Telecom | 40 (Germany) |

In many cases, there is only one carrier for a country, and so it is sufficient to report only the country.

In furtherance of the invention, the CDRs in each group may be analyzed and statistical results may be generated and preferably displayed on the clients 12. In a preferred embodiment, three different user presentation GUIs are presented. One GUI is presented for outbound services, one for inbound services, and one for outbound transit services. Inbound transit services are treated as inbound services. In the preferred embodiment, the outbound services GUI presents statistics by service and destination country, since a country can always be determined from the dialed number. The inbound services GUI presents statistics by service and carrier, since a carrier can always be determined by querying a network topology database with the trunk number on which the call was received. The transit services GUI presents statistics by service, final call destination (dialed country), and transit carrier. Each of the GUIs present statistics and call metrics in an readily accessible fashion. As an additional feature of the invention, the statistics and metrics may be color coded to indicate criticality.

The aforementioned presentations show the call statistics calculated from the analysis of CDRs collected over short time intervals. From these statistics, the user may easily detect a negative impact to a call service, regardless of whether the cause of the negative impact is know.

CDR ANALYSIS

In accordance with more detailed process aspects of the invention, CDRs may be analyzed to calculate many different statistics. In a preferred embodiment, at least two key statistics are calculated and presented. These are seizures and the Answer/Seizure Ratio (ASR). Seizures occur when the line between a gateway switch and a foreign carrier's switch is seized to setup a call. Seizures are sometimes referred to as call attempts. Seizures may be calculated by tallying the CDRs and excluding redundant CDRs (multiple CDRs are created for a single call). If a call fails for any reason, an indicator on the CDR designates a failure reason. Seizures minus failed calls equal answered calls. The ratio of answered calls to seizures is the ASR.

After a CDR is placed in a service/destination group, it may be counted as a seizure, and then either as a failed call attempt or an answered call. A call that encounters a ring-no-answer condition, for example, is considered a failed call, since it was not answered and is not billable. From the calculated number of seizures and answered calls, an ASR is calculated. The ASR is significant, as it provides the rate of answered, billable calls placed. Preferably, seizures and ASRs are calculated and presented in short time intervals, e.g. 15-minute intervals.

A failure reason may be provided on each CDR for failed calls. There are about 2000 failure reasons, which may be categorized into a number of failure categories. These categories were defined by the user community, and are discretionary. A list of EOS/Failure descriptions is illustrated in FIGS. 10A–10H.

In addition to service and destination metrics, the present invention calculates statistics per route number and failure category. When CDRs are grouped into service/destination groups, the data contained in each CDR is maintained, so that these lower-level calculations may be performed.

Referring to FIG. 2, an outbound services screen is shown. The seizures and ASR for each service are presented by destination country, for a 15-minute interval. From this screen, additional details may be selected by the user. For example, when a user selects an ASR cell, a route-by-route breakdown of statistics for the selected service for the selected destination country is presented. This screen is shown in FIG. 3. Preferably, the seizures and ASRs are presented for each route that supported the service during the interval. The route column includes both the gateway switch (i.e., DMH4) and the route number (i.e., 0448). Other statistics that are calculated from CDR data may also be shown, since these data are preserved with the CDR. A mean holding time (MHT) is calculated from the call duration data on CDRs, and indicates the mean time (averaged among all calls in a sample) the call was held on the network. The number of answered calls and failed calls, which may represent peg counts of qualified CDRs, also may be presented. From the identification, categorizing, and counting of failure codes on CDRs, the numbers of failed calls per failure category are presented.

From the route level detail screen, such as that shown in FIG. 3, a user may obtain CDR detail presentation for a particular route, by selecting a route cell. A CDR detail screen for an inbound service route is shown in FIG. 9. This screen shows call statistics for a single route, which extends from one particular gateway switch (i.e., POT3) to one particular switch of a foreign carrier, for a single service (Inbound Direct). Metrics presented include an End of Selection (EOS) code and CDR count (which equates to call count) for each dialed number prefix. The EOS code may be obtained directly from the CDR. It is preferably written to the CDR by the switch, and indicates what happened to the call, such as whether the call was successfully answered, or failed due to some reason. There is an EOS code for every call. For failed calls, the system uses the EOS code to categorize the call into one of the six failure categories. A dialed number prefix corresponds to a particular geographical calling area that is typically a small section of a city, perhaps covering a few square miles. Since this particular screen example is for an inbound service, dialed number prefixes are given as North American Numbering Plan (NANP) NPA-NXX numbers.

Using the CDR analysis method provided by the present invention, a user may detect an unusually low ASR for a service and destination country. However, different from prior art network management systems, the user may then "drill down" to the route level detail and identify a particular route that is contributing to the low ASR. From this level, a certain failure category may be seen as the reason for the low ASR. The user may then select that route and "drill down" to a CDR level detail and identify any particular calling areas for which a high number of failed calls are occurring. This level of detailed assessment of service impact, presented to users in a meaningful way, is a distinct advantage of the present invention.

An additional feature of the present invention is that each call metric on a presentation screen may be color coded to indicate a level of criticality of that metric. In the preferred embodiment, there are three levels: white indicates a first level, in which the metric falls within a threshold that is considered normal; yellow indicates a second level, in which the metric exceeds a first threshold but falls within a second threshold and is considered a warning; red indicates a third level, in which the metric exceeds the second threshold and is considered critical. The color coding system is particularly advantageous as it quickly alerts users to metrics that are likely to cause problems.

Internal Process Architecture

Figure 4:
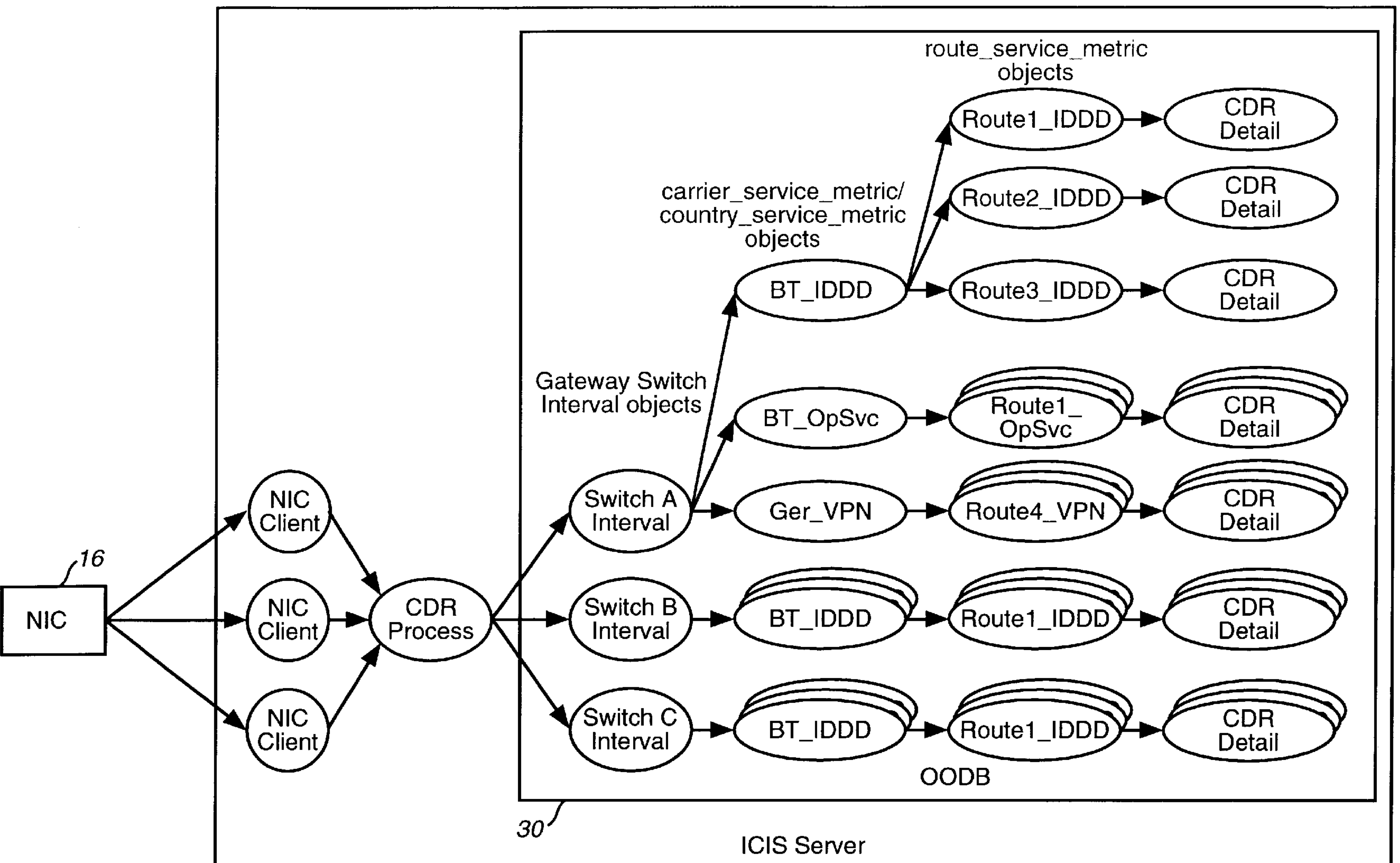
FIG. 4 depicts the process architecture of an embodiment of the invention.

The CDR analysis process described above may be performed by an appropriately programmed general purpose computer such as server 10. In a preferred embodiment, server 10 may be a mid-range computer such as a DEC Alpha server or an IBM Reporting System/6000. The above described CDR analysis process may be implemented in a variety of ways using various process architectures all of which are encompassed by the invention. FIG. 4 illustrates an exemplary internal process architecture of the server 10. In a preferred embodiment, the server 10 may include call metrics and processes in the form of instantiated objects. The server 10 may also embody an object-oriented database (OODB) 30 for storing collected and calculated data. Preferably, the instantiated object processes (with the exception of the NIC Clients and CDR Process) reside in the OODB 30, and each process writes the data that it calculates to the OODB 30.

As shown by the process architecture of FIG. 4, CDRs are transmitted from the NIC 16 to the server 10. A plurality of NIC Client processes are used to manage communications with the NIC 16; they are shown for exemplary purposes in FIG. 4 and are further described in U.S. patent application Ser. No. 08/426,256. The NIC Clients may receive the CDRs in typical data record form, preferably TCP/IP packets, for example; extract the CDRs as data records; and forward the CDRs to CDR Process object. The CDR Process object groups CDRs into short time intervals, the time intervals being defined by the timestamp on the CDR, and not on the current system time of the server 10. However, CDRs are received from multiple gateway switches in different time intervals; that is, at a specific time, server 10 may receive a CDR from a first switch that is timestamped at 12:00:00 and a CDR from a second switch that is timestamped at 12:03:00. This is due to the different CDR processing loads on each switch. Therefore, CDR Process defines a short time interval for each switch, e.g. a 15-minute interval. These intervals are referred to as Switch Intervals. A Switch Interval is manifest as an object that is instantiated for a specific 15-minute interval for a specific gateway switch. As shown in FIG. 4, there is a Switch Interval object for each Switch (A, B, and C) in the network in FIG. 1.

When CDR Process object receives a CDR, CDR Process object first identifies the switch that created the CDR. If a Switch Interval object for that switch is currently open, CDR Process writes the CDR to that Switch Interval. Otherwise, CDR Process instantiates a new Switch Interval object for that switch. At this point, the Switch Interval object is manifest as temporary data storage in the server 10's memory, accessed only by CDR Process. As CDR Process object receives additional CDRs from that switch, it writes these CDRs to the open Switch Interval Object. In a preferred embodiment, when a CDR from a switch is received that is timestamped with a time equal to the short time interval, e.g., 15 minutes from the Switch Interval start time, the Switch Interval is completed, and CDR Process commits the Switch Interval object to the OODB 30.

Since Switch Intervals are objects, they may contain data (CDRs) and methods for processing that data. When CDR Process commits a Switch Interval object to the OODB 30, it triggers a method in that object for processing the CDRs in that object. This processing groups the CDRs by service and destination. Service may be explicitly given on each CDR by a service code; destination may be derived from the dialed number or route number or both, which may be given in the CDR. Services may be grouped into Inbound Services, Outbound Services, or Outbound Transit Services. Examples of Inbound Services include Direct (IDDD), International Transit, World Phone (an MCI service), Free Phone (an MCI service), toll-free, VPN (such as MCI's VNET), and Operator Services. Examples of Outbound Services include Direct, International Transit, World Wide Direct Dial, VPN, Automated Switch Announcement Message, and Operator Service. Destinations may be given as a country, carrier, or both. Each Switch Interval thus creates multiple groups of CDRs in accordance with a destination metrics and services metrics. These groups are instantiated objects comprising CDR metrics and methods for processing those CDR metrics. The objects may be referred to as carrier_service_metric objects and country_service_metric objects. For each service, a Switch Interval can place a CDR in a carrier_service_metric object, a country_service_metric object, or both, depending on user presentation and reporting requirements. For example, as shown in FIG. 4, there is a carrier_service_metric object called BT_OpSvs; representing CDRs that are created from operator service calls to British Telecom. There may be a country_service_metric object called Ger_VPN for VPN calls to Germany.

Preferably, each carrier_service_metric object contains a CDR metric object for that carrier/service combination for calculating CDR metrics. In a preferred embodiment, seizures and failures are counted. Each CDR metric object represents a peg count of CDRs that contribute to that metric. For each CDR that a carrier_service_metric object receives for a failed call, for example, the "failures" counter is incremented by one. From seizures and failures, ASR may be calculated by the carrier service metric object according to the following simple formula: [ASR=(seizures-failures)/seizures]. The metrics may be stored in the OODB 30 when the Switch Interval has been committed to the OODB 30.

A carrier_service_metric object preferably groups its CDRs by route number. A route_service_metric object may be instantiated for each route number, and each CDR may be written to the appropriate route_service_metric object. Each route_service_metric tracks CDR metrics for an individual route and service. By definition, a route only serves one destination, so no carrier designation is needed. However, a route may carry calls for multiple services, so a route_service_metric object exists for each service type carried over a particular route. Like the carrier_service_metric objects, route_service_metric objects preferably include CDR metric objects that calculate the seizures, failures, and ASR for corresponding route/service combinations, and records these metrics to the OODB 30. These calculations are preferably performed within time intervals defined by the Switch Interval groupings.

Figure 5:
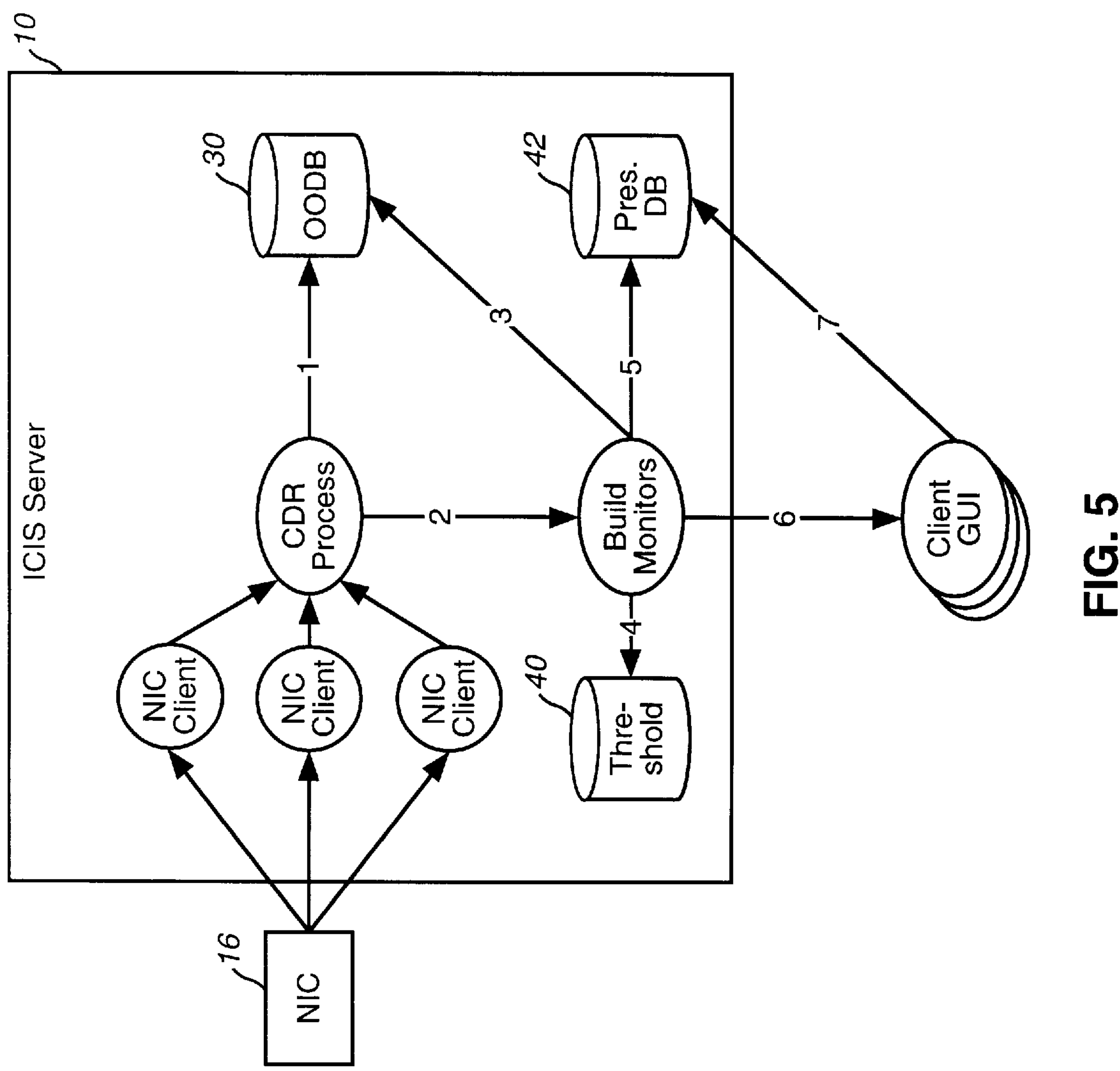
FIG. 5 shows internal process architecture for generating displays.

Each route_service_metric object maintains a list of failed calls and failure reasons. This may be done by instantiating a CDR Detail object, or simply by keeping all CDR detail data as attributes of the route_service_metric object. Either way, the route_service_metric object writes all CDR detail data for its route/service to the OODB 30. After the relevant metrics are recorded in OODB 30, they may be graphically displayed for user evaluation. FIG. 5 illustrates exemplary internal process architecture for generating graphic displays of call metrics or GUIs.

Another feature of the invention, its presentation. The process for generating graphic displays realized by the internal process architecture of FIG. 5 will be referred to hereinafter as Build Monitors. The graphic displays are created from the data in the OODB 30. The graphic displays depict call metrics preferably in a grid format. In addition, in accordance with a advantageous aspect of the invention, each call metric may be color coded to indicate the level of criticality of that metric. In operation, Build Monitors extracts data from the OODB 30, applies threshold rules to each metric to determine the level of criticality of that metric, translates the level of criticality to a color code, and sends all data and color codes to each client 12's GUI. The client 12's GUI then formats the data into screens for user presentation.

Build Monitors preferably performs this process in the same time interval by which CDR Process groups CDRs. The completion of each Switch Interval triggers a process execution by Build Monitors. Thus, all call data is collected and presented each time a single gateway Switch Interval is completed.

As shown in FIG. 5, CDR Process commits a completed Switch Interval object to the OODB 30 upon receipt of a CDR that is timestamped X minutes beyond the Switch Interval start time. In a preferred embodiment, X=15. When CDR Process commits a completed Switch Interval object to the OODB 30, it triggers the Build Monitors process execution.

Build Monitors extracts from the OODB 30 all call metrics. These include seizures, failures, answers, and ASRs, grouped by destination/service, route/service, failure category, and other parameters as previously described. The data are collected from each carrier__service__metric object, country__service__metric object, and route__service__metric object that is generated from each Switch Interval object. Because calls for a single destination/service group may be carried by more than one gateway switch, the Build Monitors process preferably collect calls statistics for a certain destination/service group from multiple carrier__service__metric/country__service__metric objects (one from each Switch Interval object for a gateway switch that carried calls for that destination/service group).

Build Monitors retrieves threshold objects from a Thresholds Database for carrier and country services. The Thresholds Database is preferably an OODB that embodies thresholds as objects. In a preferred embodiment, there are two thresholds for each metric for each hour of each day of the week. Further, thresholds for seizures and ASRs are preferably maintained for each hour for each day. A first threshold represents "warning" levels, which may be coded yellow, and a second threshold represents "critical" levels, which may be coded red. The thresholds are dynamic, in that they may change with each hour. Also, the thresholds may applied to mean (average) values, which are dynamically updated by the process described in connection with FIG. 6.

Figure 7:
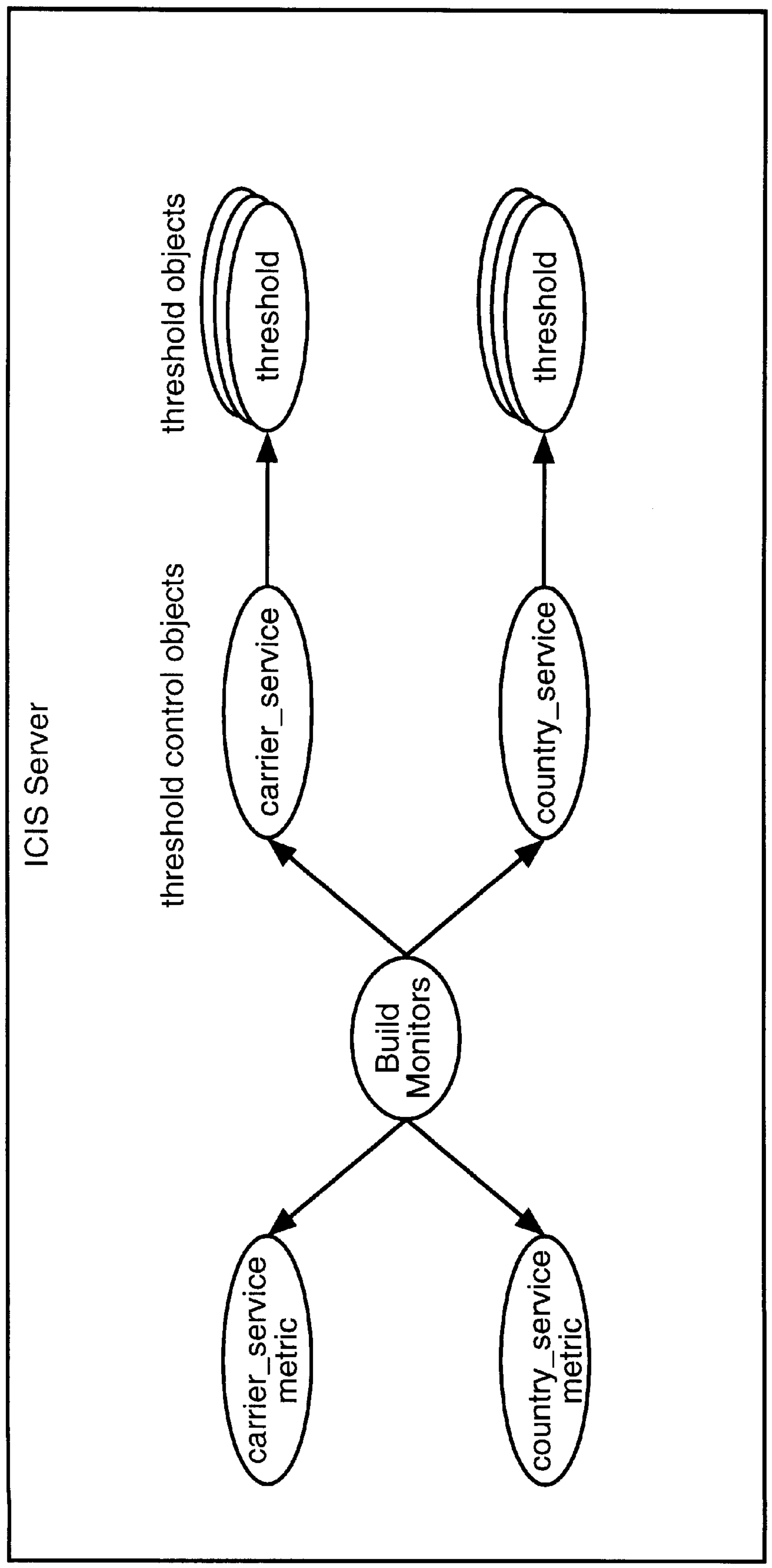
FIG. 7 shows process architecture for applying thresholds.

FIG. 7 illustrates an internal process architecture for implementing and applying thresholds. For each carrier__service__metric or country__service__metric object, the Build Monitors process retrieves a corresponding threshold control object from the Thresholds Database. Each threshold control object includes a list of threshold objects for that destination and service combination. Each threshold object may be specific to a day/hour segment, and preferably includes the methods for applying the thresholds. An historical mean for each metric may also be included in the threshold object. Actual threshold values, which in the preferred embodiment are given as percentages of variance from a mean, may be maintained in a configurable file and may be loaded from that file into the threshold object in the threshold database 40.

In operation, the Build Monitors process calls on a threshold control object and passes to it the CDR metric values from the carrier__service__metric or country__service__metric object. The threshold control object then calls on the threshold object that corresponds to the particular day/hour in which the switch interval falls. The threshold object then retrieves threshold values from the database and applies them to the CDR metrics. For example, the threshold object applies two thresholds (one for warning level and one for critical level) to each of two metrics (seizures and ASR) to determine with what color code each of these metrics should be presented. The threshold object then returns to Build Monitors the value and color code for each metric.

Once the thresholds are calculated they are preferably applied. A preferred method of applying thresholds is described as follows. This thresholds process compares the seizures and ASR values of the actual data that is collected from the OODB 30 with the thresholds to determine the color of each cell in a graphical display. An historical mean value is used for each metric, which is drawn from historical data in the OODB 30. Mean values are dynamic, they are constantly updated to reflect changing data. In a preferred embodiment, the mean is calculated over the most recent 8 samples. Thresholds may be stated as a percent delta from the mean. Though thresholds are given on a per hour basis, they are applied to regular intervals, e.g., 15-minute intervals, of CDR metrics. Thus, an hourly threshold may be compared to four intervals of data for a metric.

EXAMPLE 1

Seizures

Suppose a mean value is given as 800 (indicating 800 seizures for a 15 minute interval). A warning threshold for a day/hour interval may be given as 20% delta; this means the threshold is exceeded if the actual value of seizures for a 15-minute interval is 20% greater or less than the mean value.

A critical threshold for a day/hour interval is given as 30% delta; this means the threshold is exceeded if the actual value of seizures for a 15-minute interval is 30% greater or less than the mean value. Thus, the seizures value is color-coded: white, if X<20% delta from 800; yellow, if 20%<X<30% delta from 800; red, if X>30% delta from 800; 20% of 800=160; 30% of 800=240. If the actual number of seizures, X, for the 15-minute interval that falls within this day/hour interval is between: 959 and 641, the "seizures" value is coded white; 561 and 640, or 960 and 1039, the value is coded yellow; 0 and 560, or greater than 1040, the value is coded red.

EXAMPLE 2

ASR

Suppose a mean value is given as 70 (ASR is expressed as a percent). A warning threshold for a day/hour interval may be given as 20% below mean.

A critical threshold for a day/hour interval may be given as 30% or more below mean. (With ASR, we are only concerned if it falls too low.) Thus, the ASR value is color-coded: white, if ASR is greater than, 70–20%=56; yellow, if ASR is between: 70–29%=50 and 56, inclusive; red, if ASR is equal to or less than: 70–30%=49.

All of the values given in Examples 1 and 2 are for purposes of illustration only. The skilled artisan will recognize that the values may be changed to accommodate changing conditions.

Build Monitors stores data (actual values and color codes) in a Presentation Database 42. Data may be stored as flat files in a relational database or as objects in an OODB, or as other types of data in other types of databases. The Presentation Database 42 may be located on the server 10, on a different but co-located computer, or, preferably on a remote computer that is local to the clients 12 for performance purposes.

When the Presentation Database 42 has been built for the latest interval, Build Monitors sends a message to each Client 12 that is logged in to the server 10. This message triggers the clients 12 to retrieve the latest data from the Presentation Database 42. Each Client 12 retrieves and displays the latest data from the Presentation Database 42. In this way, the graphic displays are updated automatically, without the user having to trigger a screen update. Each object in the Presentation Database 42 (or file if it is a relational database) has all data calculated by the carrier_service_metric and route_service_metric processes. When a user selects an ASR value from the Inbound Services screen (not shown) for example, the Client 12 retrieves from the Presentation Database 42 the route-by-route ASR values calculated by the route_service_metric objects. When a user selects a particular route, the Client 12 retrieves from the Presentation Database 42 the ASR values for each dialed number prefix and/or failure category.

Figure 6:
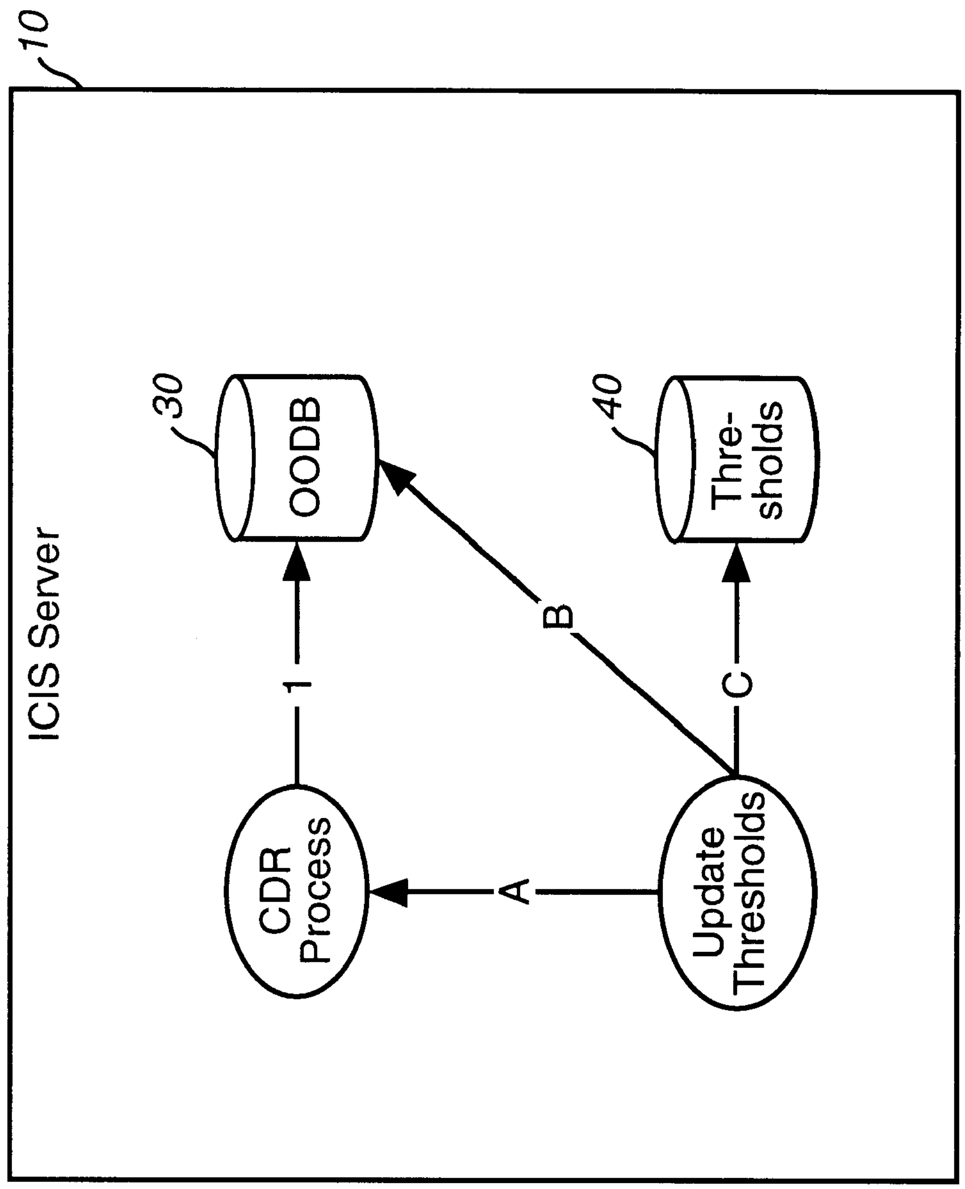
FIG. 6 illustrates further process architecture for generating thresholds.

FIG. 6 illustrates a process architecture for dynamically updating thresholds in accordance with the invention. This process is referred to henceforth as Update Thresholds. This process may be executed by the server 10 independently of the main process thread. Thus, it does not intrude on the CDR Process or Build Monitors, which are time-sensitive. With reference to FIG. 6, Update Thresholds monitors CDR Process to detect when the main process thread is idle enough so as not to engender interference. When the Build Monitors is finished with the current switch intervals, the switch intervals will be marked obsolete so as to avoid contention with current metrics.

At such a time, Update Thresholds collects from the OODB 30 currently recorded metrics for each interval for each switch. Update Thresholds then calculates the mean value for each metric. In a preferred embodiment, the mean value of each metric is calculated utilizing the most recent 8 samples for each hour of each day of the week. This calculation may be performed using an algorithm that weights the previous historical mean value with a factor of 7/8 and weights the current value with a factor of 1/8. Update Thresholds then updates the Thresholds Database with these new mean values.

INDUSTRIAL APPLICABILITY

This invention may be used in connection with any network that generates CDRs. Accordingly, the invention is not limited by the physical topology or construction of any network. More particularly, the invention may be used with conventional circuit-switched networks as well as packet-switched networks, such as the Internet.

Figure 8:
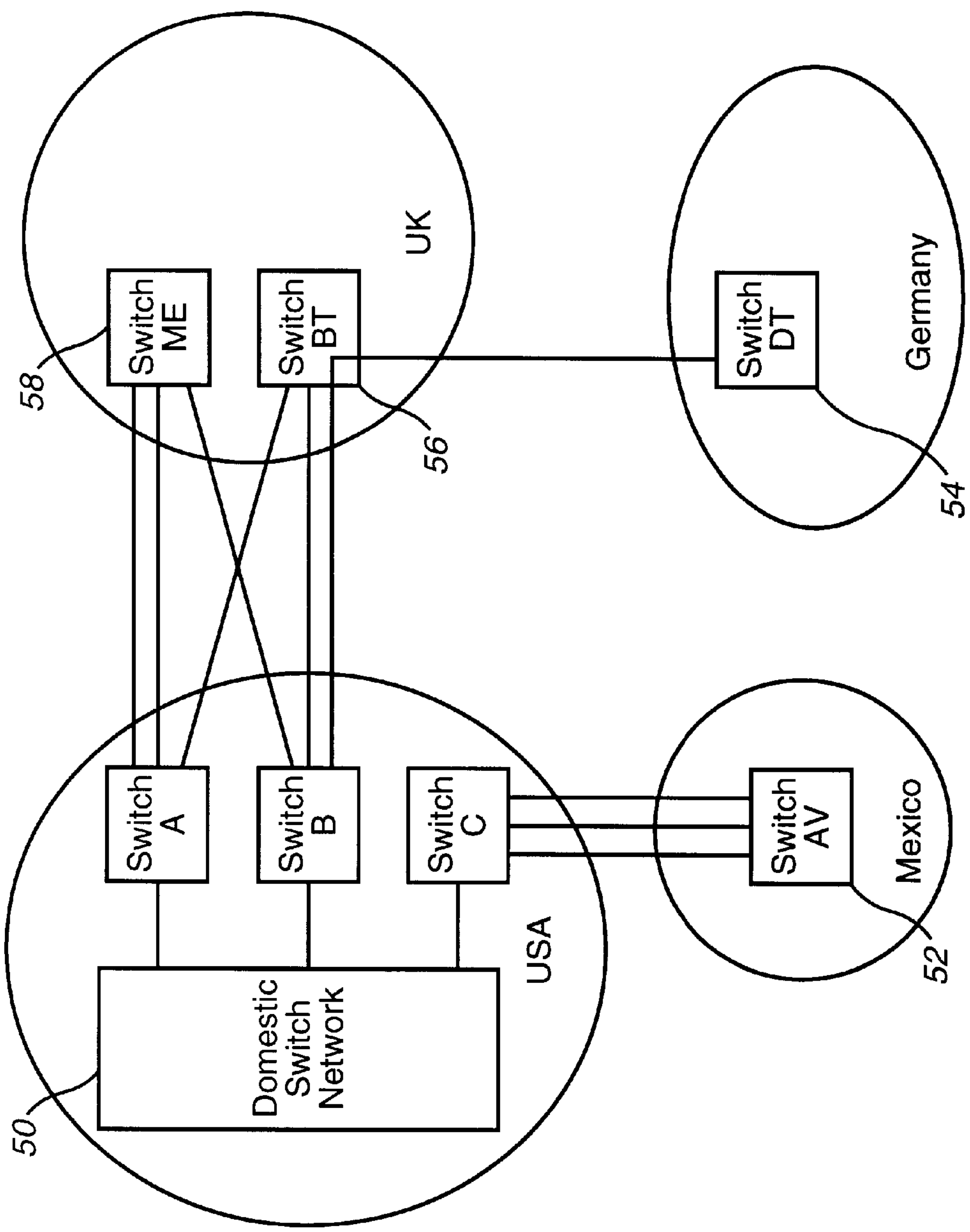
FIG. 8 depicts a hardware diagram of an international telephone switching network.

The invention is particularly suited to international circuit-switched networks. FIG. 8 illustrates an exemplary international circuit-switched network. Switches A, B and C interconnect the domestic switching network 50 with foreign switches 52–58+. Thus, switches A, B and C may be referred to as gateway switches. Examples of foreign carrier switches are Switch ME (Mercury) and Switch BT (British Telecom), both operating in the UK; Switch DT (Deutsche Telecom) operating in Germany; and Switch AV (Avantel), operating in Mexico. Particular to note is that there may be multiple routes between the same two switches, multiple routes being distinguished by different physical transmission routes. Also, multiple gateway switches (i.e., Switch A and Switch B) may be used to interconnect with the same foreign carrier switch. Also, there are transit routes, in which an intermediate carrier (Switch BT) handles calls that are destined for another country (Switch DT). With respect to the present invention, service impacts are reported based on both the final destination of calls (i.e., Switch DT) and the transit destination (Switch BT).

While various embodiments of the present invention have been described, it should be understood that they have been presented by way of example only, and not limitation. The present invention is not limited to any particular service, or destination type or route type. Services and routes are simply codes obtained from CDRs and used to group CDRs. Destinations are derived from CDR data, and are also used to group CDRs. Additional modifications and variations of the described embodiments within the scope of the appended claims will be apparent to the skilled artisan.

What is claimed is:

1. A method for analyzing the effects of network events on call services comprising:

receiving a plurality of call detail records (CDRs) from a plurality of network devices, each of the plurality of CDRs including a time stamp, call service data and call destination data;

grouping the plurality of CDRs into a plurality of first subgroups according to corresponding network devices and to the time stamps of the plurality of CDRs;

for each of the plurality of first subgroups, grouping the CDRs into a plurality of second subgroups according to a call service data and call destination data; and generating call statistics indicative of a state of call services from data contained in the CDRs for each of the plurality of second subgroups.

2. An apparatus for analyzing the effect of network events on call services comprising:

means for receiving a plurality of call detail records (CDRs) from a plurality of network devices, each of the plurality of CDRs including a time stamp, a call service data and a call destination data;

means for grouping the plurality of CDRs into a plurality of first subgroups according to corresponding network devices and to the time stamps of the plurality of CDRs;

means for grouping the CDR's of each of the plurality of first subgroups into a plurality of second subgroups according to a call service data and call destination data; and means for generating call statistics indicative of a state of call services from data contained in the CDRs for each of the plurality of second subgroups.

3. An apparatus for analyzing the effect of network events on call services, said apparatus including a computer programmed to:

receive a plurality of call detail records (CDRs) from a plurality of network devices, each of the plurality of CDRs including a time stamp, call service data and call destination data;

group the plurality of CDRs into a plurality of first subgroups according to corresponding network devices and to the time stamps of the plurality of CDRs;

for each of the plurality of first subgroups, to group the CDRs into a plurality of second subgroups according to a call service data and call destination data; and generate call statistics indicative of a state of call services from data contained in the CDRs for each of the plurality of second subgroups.

4. A system for analyzing the effect of network events on call services comprising:

means for receiving a plurality of call detail records (CDRs) from a plurality of network devices, each of the plurality of CDRs including a time stamp, a call service data and a call destination data;

means for grouping the plurality of CDRs into a plurality of first subgroups according to corresponding network devices and to the time stamps of the plurality of CDRs;

means for grouping the CDR's of each of the plurality of first subgroups into a plurality of second subgroups according to a call service data and call destination data;

means for generating call statistics from metrics contained in the CDRs for each of the plurality of second subgroups; and means for displaying the statistics in a user friendly easily readable manner.

5. A method for analyzing the effects of network events on call services comprising:

receiving a plurality of call detail records (CDRs) from a plurality of network devices, each of the plurality of CDRs including a time stamp, call service data and call destination data;

grouping the plurality of CDRs into a plurality of first subgroups according to corresponding network devices and to the time stamps of the plurality of CDRs;

for each of the plurality of first subgroups, grouping the CDRs into a plurality of second subgroups according to a call service data and call destination data;

generating call statistics indicative of a state of call services from data contained in the CDRs for each of the plurality of second subgroups;

generating a threshold value for each call statistic, each threshold value including a dynamic mean value of a corresponding call statistic over a selected time period;

comparing each call statistic to a corresponding threshold value and visually coding the statistics responsive to the comparison; and displaying the visually coded statistics to indicate call service alarm conditions.

* * * * *